United States Patent [19]

Shimada et al.

[11] 4,385,720

[45] May 31, 1983

[54] T-SHAPE JOINT AND PREPARATION THEREOF

[75] Inventors: Wataru Shimada, Takarazuka; Kazumichi Machida, Kawanishi; Masaru Okada, Amagasaki, all of Japan

[73] Assignee: Mitsubishi Denki Kabushiki Kaisha, Tokyo, Japan

[21] Appl. No.: 73,137

[22] Filed: Sep. 6, 1979

[30] Foreign Application Priority Data

Sep. 12, 1978 [JP] Japan ................................. 53-112600

[51] Int. Cl.³ .............................................. B23K 1/20
[52] U.S. Cl. .................................... 228/166; 228/258
[58] Field of Search ............ 228/165, 166, 258, 263 F; 219/137 R; 403/272

[56] References Cited

U.S. PATENT DOCUMENTS 2,598,027  5/1952  Weir et al. ......................... 228/258
3,987,953  10/1976  Casey ................................. 228/166
4,097,716  6/1978  Reichelt, Jr. et al. .......... 219/137 R

OTHER PUBLICATIONS

Annon., *Aluminum Brazing Handbook*, 1st Ed. 1971, by The Aluminum Association, New York, N.Y., p. 16.

*Primary Examiner*—Kenneth J. Ramsey
*Attorney, Agent, or Firm*—Oblon, Fisher, Spivak, McClelland & Maier

[57] ABSTRACT

A T-shape joint includes a slant gap formed between joint faces of a vertical base metal and a horizontal base metal and the slant gap is filled perfectly with a brazing alloy without remaining any defect.

The slant gap can be saw tooth shape gaps. The slant gap can be formed in the thickness direction of the vertical base metal.

The molten brazing metal penetrates into the slant gap without forming a cavity for a stronger joint.

4 Claims, 21 Drawing Figures

FIG. 3a
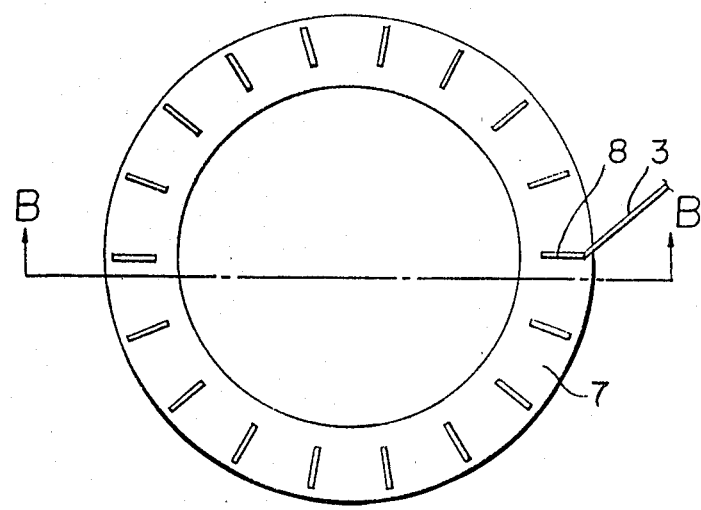
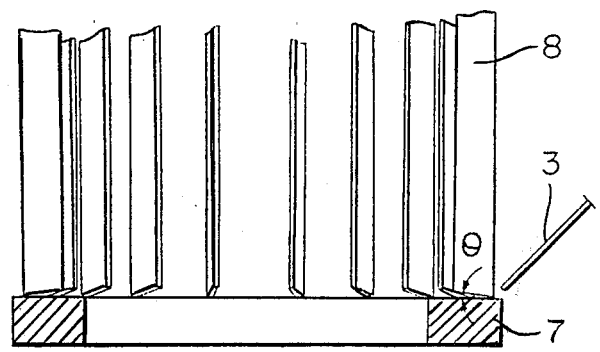
FIG. 3b

T-SHAPE JOINT AND PREPARATION THEREOF

BACKGROUND OF THE INVENTION

1. Field of the Invention

The present invention relates to a T-shape joint which does not have any cavity caused by a brazing operation and a process for preparing the T-shape joint.

2. Description of the Prior Arts

It has been known to prepare T-shape joints as shown in FIG. 1: (a) a front view; (b) a side view; and (c) a plane view (perspective view).

In FIG. 1, the lower end-face of a vertical base metal (2) is placed on the surface of a horizontal base metal (1). Both base metals (1), (2) are heated and a top of a brazing alloy (3) is brought into contact with the side of the joint surface to melt the brazing alloy and the molten alloy (4) penetrates into the joint gap whereby the T-shape joint is prepared by mounting the vertical base metal (2) on the horizontal base metal (1). In the brazing operation, the molten alloy (4) is not completely spread into the joint gap and thus forms a large cavity (5), because the molten alloy (4) is spread around the sides of the joint to surround the sides before penetrating into the joint gap between the surface of the horizontal base metal (1) and the end-face of the vertical base metal (2) during the brazing operation.

This means that the spreading and wetting action of the molten alloy (4) at the sides of the joint face is predominant in comparison with capillarity in the joint face.

Since the cavity (5) is formed at the joint face of T-shape joint by the conventional brazing method, a desired joint strength has not been achieved.

SUMMARY OF THE INVENTION

It is an object of the present invention to improve a joint strength and joint conductivity in brazing for preparing a T-shape joint by preventing a formation of a cavity between joint faces by forming a slant gap between the joint faces of a vertical base metal and a horizontal base metal and heating the base metals and melting and spreading a brazing alloy into the slant gap.

It is another object of the present invention to overcome troubles caused by a large gap at one end in the joint longitudinal direction by forming saw tooth shape slant gaps between the joint faces of the vertical base metal and the horizontal base metal of the T-shape joint.

It is the other object of the present invention to overcome troubles caused by a large gap at one end in the joint longitudinal direction by forming a slant gap between the joint faces of the vertical base metal and the horizontal base metal of the T-shape joint in the thickness direction of the vertical base metal by placing it in a slant position or processing the end-face to form a slant face.

DESCRIPTION OF THE DRAWINGS

FIG. 3 shows one embodiment of the present invention applied for a rotor of a rotator: (a) is a plane view (perspective view) and (b) is a sectional view taken along the B—B line of (a);

DETAILED DESCRIPTION OF THE PREFERRED EMBODIMENTS

Figure 1A:
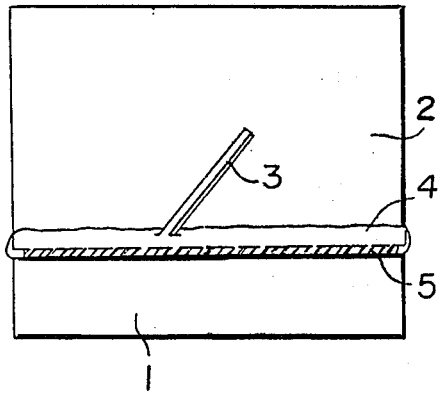
FIG. 1 shows a condition of the conventional brazing of a T-shape joint: (a) is a front view; (b) is a side view; (c) is a plane view (perspective view)
Figure 2A:
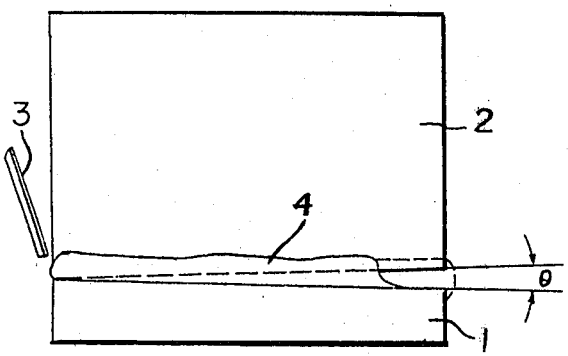
FIG. 2 shows a condition of the brazing of a T-shape joint according to the present invention: (a) is a front view; (b) is a side view; and (c) is a plane view (perspective view)
Figure 1B:
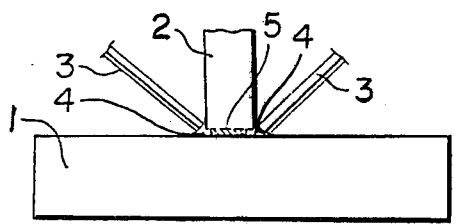
Figure 2B:
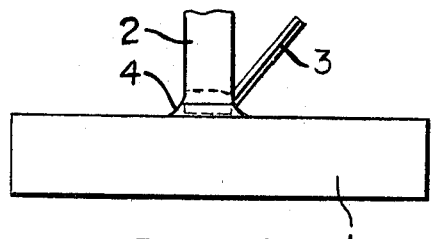
Figure 1C:
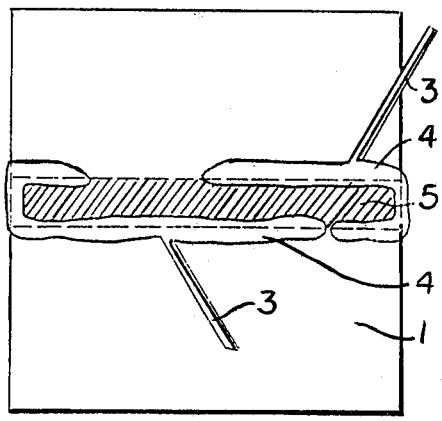
Figure 2C:
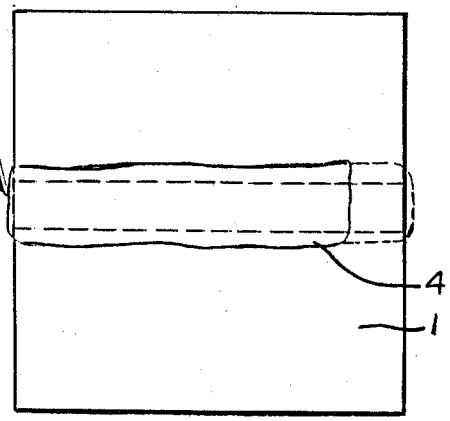

FIG. 2 shows one embodiment of the T-shape joint of the present invention wherein (a) is a front view; (b) is a side view and (c) is a plane view (perspective view).

In the drawing, like reference numerals designate identical or corresponding parts throughout the several views.

The vertical base metal (2) is placed on the horizontal base metal (1) with a slant angle $\theta$ in the joint longitudinal direction whereby the mutual slant gap is formed so as to increase the gap in the joint longitudinal direction between the horizontal base metal (1) and the vertical base metal (2).

The horizontal base metal (1) and the vertical base metal (2) are heated in this position and the top of the brazing alloy (3) is brought into contact with them at the small gap part in the slant gap so as to penetrate into the gap. In this embodiment, the spreading and wetting action of the molten alloy (4) at the sides of the joint faces is not predominant to the capillarity whereby the molten alloy is completely penetrate into the gap of the joint. The molten alloy (4) is flowed to the large gap part (right side in FIG. 2) as shown by the dotted line, and the gap of the joint face is filled with the molten alloy (4) and no cavity is formed as a result and the T-shape joint having enough joint strength and high conductivity can be obtained. The slant angle $\theta$ can be decided depending upon the condition for the brazing and it is preferably in a range of 3 to 45 degrees.

FIG. 3 shows another embodiment for applying the present invention to the manufacture of a rotor of a rotator wherein (a) is a plane view and (b) is a sectional view taken along the B—B line of (a).

In FIG. 3, a plurality of bars (8) as the vertical base metals are radially mounted on the surface of a flange (7) in a ring form as the horizontal base metal by brazing at the lower end-faces of the bars. FIG. 3 shows the condition before the brazing. The lower end-face of the bar (8) as the joint faces is placed on the surface of the flange (7) with a slant angle in the joint longitudinal direction so as to increase the gap in the center direction. The slant processing of the joint faces of the bars (8) is carried out by a lathe. The flange (7) and the bars (8) are heated and the tops of the brazing alloy (3) are respectively brought into contact with them at the smaller gap parts of the joint in the slant gaps so as to penetrate. The brazing can be completed without any cavity the same as that of the former embodiment and the bars (8) can be vertically mounted on the flange (7) in high strength.

Figure 4A:
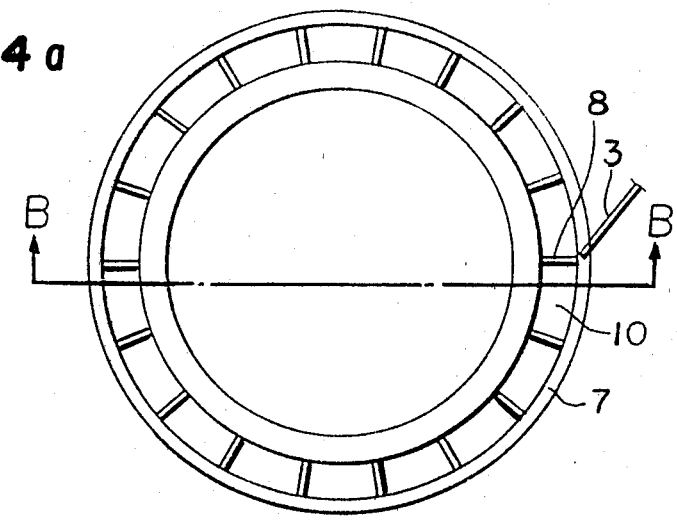
FIG. 4 shows the other embodiment of the present invention applied for a rotor of a rotator: (a) is a plane view (perspective view); and (b) is a sectional view taken along the B—B line of (a)
Figure 4B:
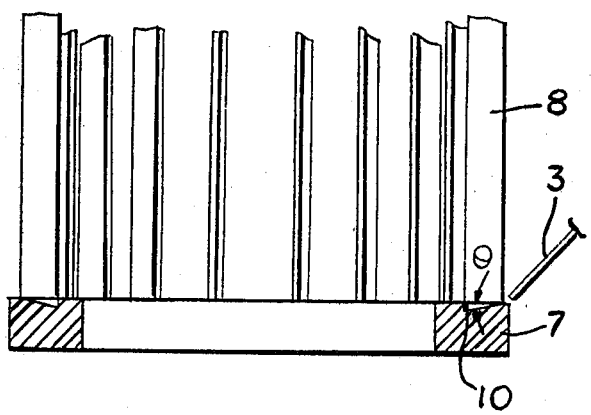

FIG. 4 shows the other embodiment for applying the present invention to the manufacture of a rotor of a rotator wherein (a) is a plane view and (b) is a sectional view taken along the B—B line of (a). In the drawing like reference numerals designate identical or corresponding parts.

A ring groove (10) having a slant bottom is formed on the surface of the flange (7) so as to be deeper in the central direction. A plurality of bars (8) are placed on the groove (10). The joint face as the bottom of the groove (10) is slant to the end-faces of the bars (8) as the joint faces so as to increase the gaps in the central direction. That is, the slant gaps are formed in the joint longitudinal direction. In this structure, the brazing can be completed without any cavity as the same with that of FIG. 3 and the bars (8) can be vertically mounted on the flange (7) in high strength.

In these embodiments, one of the horizontal base metal or the vertical base metal had a slant joint face. It is also possible to form each slant face on both of the base metals. The feeding of the brazing alloy is carried out from the narrowest gap part in the joint faces. It is also possible to spread the brazing alloy from the other part or from plural parts at the gap in the actual brazing process.

Figure 5B:
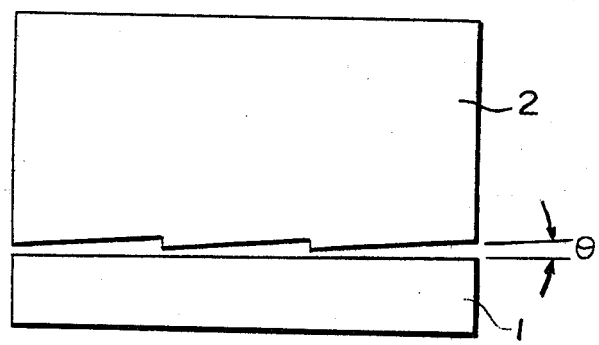
FIG. 5 is a schematic view of the other embodiment of a T-shape joint of the present invention.

FIG. 5 shows the other embodiment of the joint of the present invention wherein the end-face of the vertical base metal (2) is processed in a saw tooth shape so as to form saw tooth shape slant gaps in order to decrease the maximum joint gap.

Figure 6A:
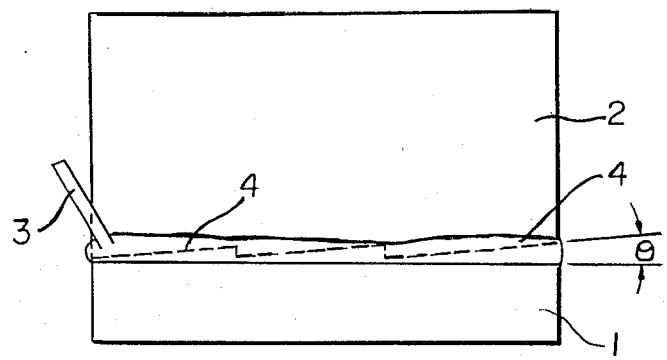
FIG. 6 shows a condition of the brazing of the T-shape joint of FIG. 5: (a) is a side view; (b) is a front view and (c) is a plane view (perspective view)
Figure 6B:
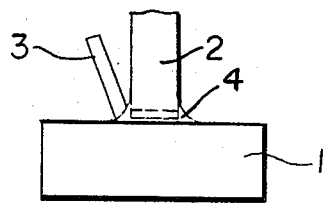
Figure 6C:
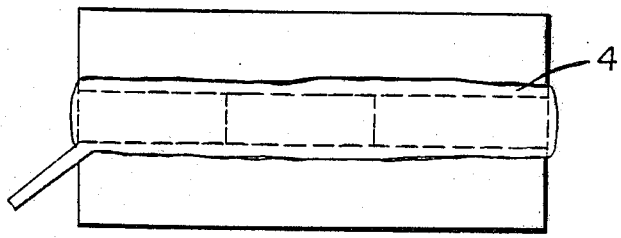

FIG. 6 shows the condition for brazing to manufacture the T-shape joint of the present invention wherein (a) is a side view; (b) is a front view and (c) is a plane view (perspective view).

In the embodiment of the joint of the present invention, the slant gaps in the saw tooth shape are formed. The horizontal base metal (1) can be processed to form such slant gaps in the saw tooth shape. The saw tooth shape means to include a shape having convex and concave parts.

Figure 7A:
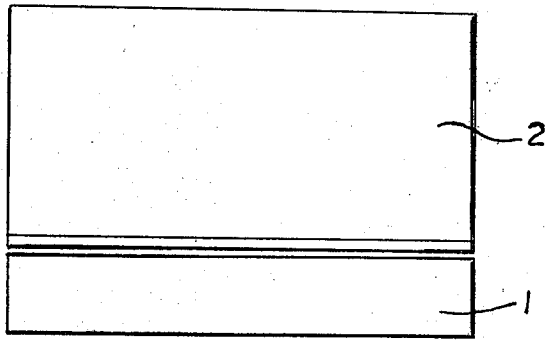
FIG. 7 shows the other embodiment of the present invention: (a) is a side view and (b) is a front view.
Figure 7B:
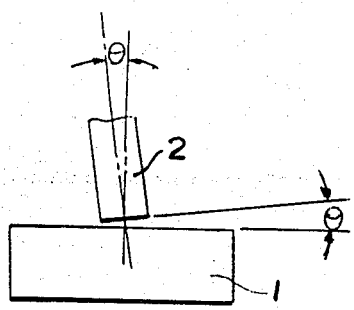
Figure 8A:
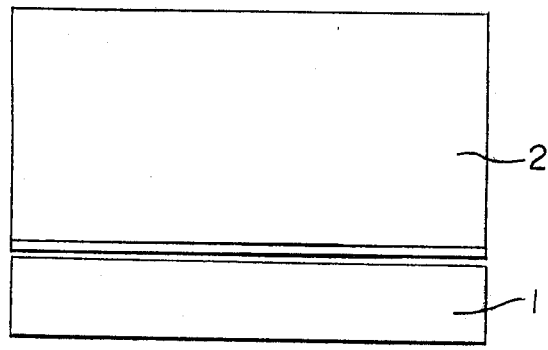
FIG. 8 shows the other embodiment of the present invention: (a) is a side view and (b) is a front view.
Figure 8B:
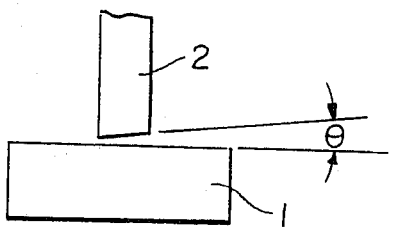

Referring to FIGS. 7 and 8, another embodiment of the present invention will be illustrated.

The vertical base metal (2) is placed or processed to have a slant gap in the transversal direction of the vertical base metal (2). In FIGS. 7 and 8, (a) is a side view and (b) is a front view.

In the embodiment of FIG. 7, the vertical base metal (2) is placed on the horizontal base metal (1) to have a desired slant gap as the joint gap in the transversal direction (thickness direction).

In the embodiment of FIG. 8, the end of the vertical base metal (2) is processed so as to form a desired slant end-face in the transversal direction (thickness direction) and the slant end-face of the vertical base metal is placed on the surface of the horizontal base metal (1).

When the slant gap is formed in the longitudinal direction without the saw tooth shape and the length of the joint face is long, even though the slant gradient $\theta$ is 3 degrees, the maximum gap at one side is remarkably large. Accordingly, the volume of the gap should be large and the amount of the brazing alloy for completely filling the gap is large and the operation time is long.

Figure 9A:
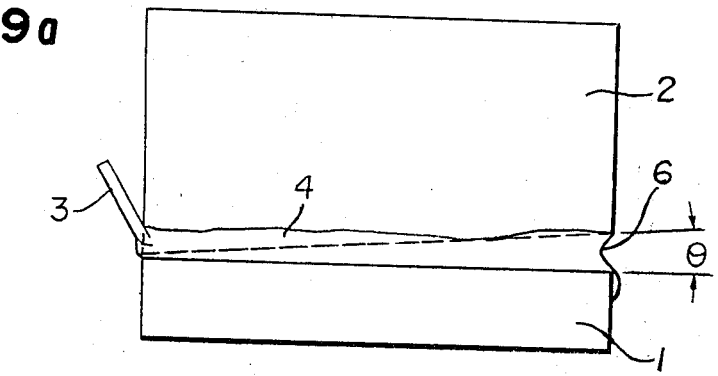
FIG. 9 is to illustrate a practical problem of the T-shape joint: (a) is a side view; (b) is a front view and (c) is a plane view (perspective view).
Figure 9B:
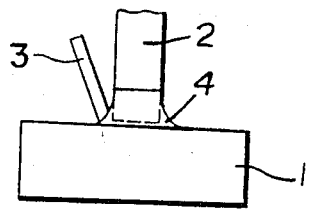
Figure 9C:
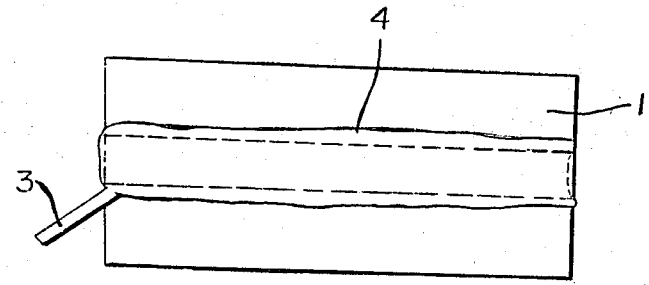

Referring to FIG. 9, the problem in such feature will be illustrated. In FIG. 9, (a) is a side view, (b) is a front view and (c) is a plane view (perspective view) and the reference numeral (6) designates a concave.

In the joint having the large gap part shown in FIG. 9(a), the molten brazing alloy can not be held by the self surface tension at the joint faces and a stable fillet can not be formed, and a concave (6) is formed at the joint part. This is disadvantageous in view of the joint strength.

In accordance with the embodiments of the joints having the slant gap shown in FIGS. 6 to 8, the concave (6) is not formed and the stable joints having high quality can be formed.

In order to prevent the formation of the cavity in the brazed joint which is often caused to remarkably deteriorate the function of the T shape joint, it is remarkably effective to improve the shape of the joint faces so as to form a slant gap between the joint faces.

In the case of the saw tooth shape slant gaps in the T shape joint, even though the width of the vertical base metal (2) is large to have a long joint length, the brazed joint having no defect can be obtained without any trouble considered in the embodiment of non-saw tooth shape slant gap.

We claim:

1. A process for preparing a T-shaped joint by brazing or soldering an end face of a substantially vertical base metal onto a surface face of a horizontal base metal which comprises:
   forming a slant gap between the joint faces of said vertical base metal and said horizontal base metal by forming a groove in said horizontal base metal so as to widen in a joint longitudinal direction
   heating said vertical base metal and said horizontal base metal
   contacting said slant gap at the narrowest point of said slant gap with a brazing or soldering alloy member; and
   filling said glant gap with said brazing or soldering alloy member from the narrowest part of slant gap to the widest part of said slant gap.

2. A process for preparing a T-shaped joint by brazing or soldering an end face of a substantially vertical base metal onto a surface face of a horizontal base metal which comprises:
   forming a slant gap between the joint faces of said vertical base metal and said horizontal base metal by forming a plurality of consecutive saw tooth shaped slant gaps so as to widen in a joint longitudinal direction;
   heating said vertical base metal and said horizontal base metal;
   contacting said slant gap at the narrowest point of said slant gap with a brazing or soldering alloy member; and
   filling said slant gap with said brazing or soldering alloy member from the narrowest part of said slant gap to the widest part of said slant gap.

3. A process for preparing a T-shaped joint by brazing or soldering an end face of a substantially vertical base metal onto a surface face of a horizontal base metal which comprises
   forming a slant gap between the joint faces of said vertical base metal and said horizontal base metal by forming a groove in said horizontal base metal so as to widen in a joint transverse direction;
   heating said vertical base metal and said horizontal base metal;

contacting said slant gap at the narrowest point of said slant gap with a brazing or soldering alloy member; and filling said slant gap with said brazing or soldering alloy member from the narrowest part of said slant gap to the widest part of said gap.

4. A process for preparing a T-shaped joint by brazing or soldering an end face of a substantially vertical base metal onto a surface face of a horizontal base metal which comprises:

forming a slant gap between the joint faces of said vertical base metal and said horizontal base metal by forming a plurality of consecutive saw tooth shaped slant gaps so as to widen in a joint transverse direction;

heating said vertical base metal and said horizontal base metal;

contacting said slant gap at the narrowest point of said slant gap with a brazing or soldering alloy member and filling said slant gap with said brazing or soldering alloy member from the narrowest part of said slant gap to the widest part of said slant gap.

* * * * *